United States Patent
Song

(10) Patent No.: US 7,173,816 B2
(45) Date of Patent: Feb. 6, 2007

(54) PORTABLE COMPUTER

(75) Inventor: Young-shin Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 11/140,078

(22) Filed: May 31, 2005

(65) Prior Publication Data

US 2005/0276010 A1   Dec. 15, 2005

(30) Foreign Application Priority Data

Jun. 9, 2004   (KR) ...................... 10-2004-0042136

(51) Int. Cl.
*G06F 1/16* (2006.01)
(52) U.S. Cl. ................. 361/683; 312/223.1; 345/550.1
(58) Field of Classification Search ........ 361/679–687, 361/724–727; 312/223.1–223.6; 345/550.1, 345/1.1; 224/269
See application file for complete search history.

(56) References Cited

U.S. PATENT DOCUMENTS 6,310,766 B1 * 10/2001 Bae ............................ 361/681
6,563,699 B1 * 5/2003 Choi .......................... 361/683
2005/0168924 A1 * 8/2005 Wu et al. .................... 361/683
2006/0007649 A1 * 1/2006 Yang .......................... 361/683

FOREIGN PATENT DOCUMENTS

KR   1996-0005324   11/1999

* cited by examiner

*Primary Examiner*—Hung Van Duong
(74) *Attorney, Agent, or Firm*—Roylance, Abrams, Berdo & Goodman, L.L.P.

(57) ABSTRACT

A portable computer having a computer main body, a display connected to the computer main body, a hooking part provided in one of the computer main body and the display, and a latch part provided in the other of the computer main body and the display. The latch part is movable between a hooking position hooked to the hooking part and an unhooking position unhooked to the hooking part. A rotating operator is rotatably coupled to the latch part, and selectively moves the latch part to the hooking position and the unhooking position according to a rotating direction thereof.

12 Claims, 8 Drawing Sheets

PORTABLE COMPUTER

CROSS-REFERENCE TO RELATED APPLICATIONS

This application claims the benefit under 35 U.S.C. § 119(a) of Korean Patent Application No. 2004-0042136, entitled "Portable Computer," filed on Jun. 9, 2004, the entire disclosure of which is hereby incorporated by reference.

BACKGROUND OF THE INVENTION

1. Field of the Invention

The present invention relates to a portable computer. More particularly, the present invention relates to a portable computer comprising an improved locking structure for a display and a computer main body.

2. Description of the Related Art

Generally, a portable computer comprises a computer main body accommodating a plurality of hardware. A display is connected to the computer main body and displays an image. A hinge rotatably supports the display for opening and closing with respect to the computer main body.

A conventional portable computer comprises a locking apparatus to prevent the display from being unexpectedly opened.

As a locking apparatus, Korean Utility Model Publication No. 1993-0030331 discloses a latch structure for the locking apparatus of a portable computer comprising a hook having a latch protrusion at an upper part thereof and formed with a rotating hole at a lower part thereof. A bracket rotatably supports the hook, and is formed with a stopper to limit rotation and has coupling parts at opposite sides. A return spring is elastically supported at opposite ends thereof by the bracket and the hook, and is integrally supported by a rotating pin inserted into the rotating hole. A knob is slidably coupled to a back side of the bracket, and is coupled to the hook for moving with the hook.

However, the conventional locking apparatus has a problem in that the unlocking operation is complicated.

Therefore, a need exists for a portable computer having an improved and simplified locking system for preventing the display from being unexpectedly opened.

SUMMARY OF THE INVENTION

Accordingly, it is an aspect of the present invention to provide a portable computer having a simple unlocking device for opening a display with respect to a computer main body that is easy to operate.

The foregoing and other objects are substantially realized by providing a connector device and display device using thereof comprising a computer main body, a display connected to the computer main body, a hooking part provided in one of the computer main body and the display, a latch part provided in the other of the computer main body and the display. The latch part is movable between a hooking position hooked to the hooking part and an unhooking position unhooked to the hooking part. A rotating operator is rotatably coupled to the latch part, and selectively moves the latch part to the hooking position and the unhooking position according to a rotatational direction thereof.

According to the present invention the hooking part comprises a hook accommodator in the computer main body, and the latch part is provided in the display and comprises a hook adapted to be hooked to the hook accommodator.

According to an embodiment of the present invention, the rotating operator comprises a rotating supporter adapted to rotate with respect to the latch part, and a rotating knob disposed on a side of the rotating supporter for rotating the rotating supporter. A latch pressing part is disposed adjacent to the rotating knob for transmitting a rotating force of the rotating supporter from the rotating knob to the latch part.

The latch part comprises an installing part in which the rotating operator is installed. The rotating supporter is rotatably installed inside of the installing part and an incline is formed on a side of the installing part for contacting the latch pressing part.

Also, in accordance with embodiments of the present invention, a supporting rib supporting the rotating operator in the installing part projects from an inner surface of the display and supports the rotating operator at a back side thereof. A supporting bracket supports the rotating operator at a front side thereof.

A spring part is coupled to the rotating operator, and biases the rotating operator to an opposite direction with the respect to the rotational direction of the rotating operator in which the latch part moves to the unhooking position.

Also in accordance with the present invention, the display rotates with respect to the computer main body according to the rotating operator in the state that the rotating operator rotates for moving the latch part to the unhooking position.

Other objects, advantages, and salient features of the invention will become apparent from the detailed description, which, taken in conjunction with the annexed drawings, discloses preferred embodiments of the invention.

BRIEF DESCRIPTION OF THE DRAWINGS

These and other aspects, features, and advantages of certain embodiments of the present invention will be more apparent from the following detailed description taken with reference to the accompany drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements thereof, are provided to assist in a comprehensive understanding of the embodiments of the invention. Accordingly, those of ordinary skill in the art will recognize that various changes and modifications of the embodiments described herein can be made without departing from the scope and spirit of the invention.

Figure 1:
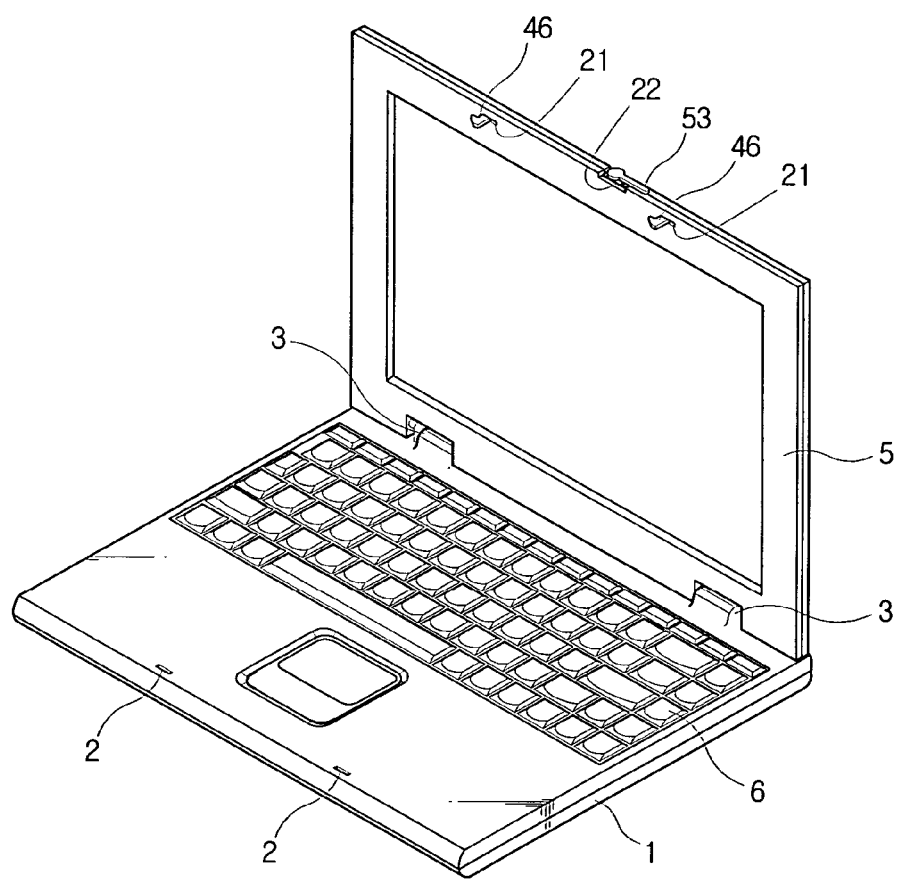
FIG. 1 is a perspective view of a portable computer in accordance with an embodiment the present invention.
Figure 2:
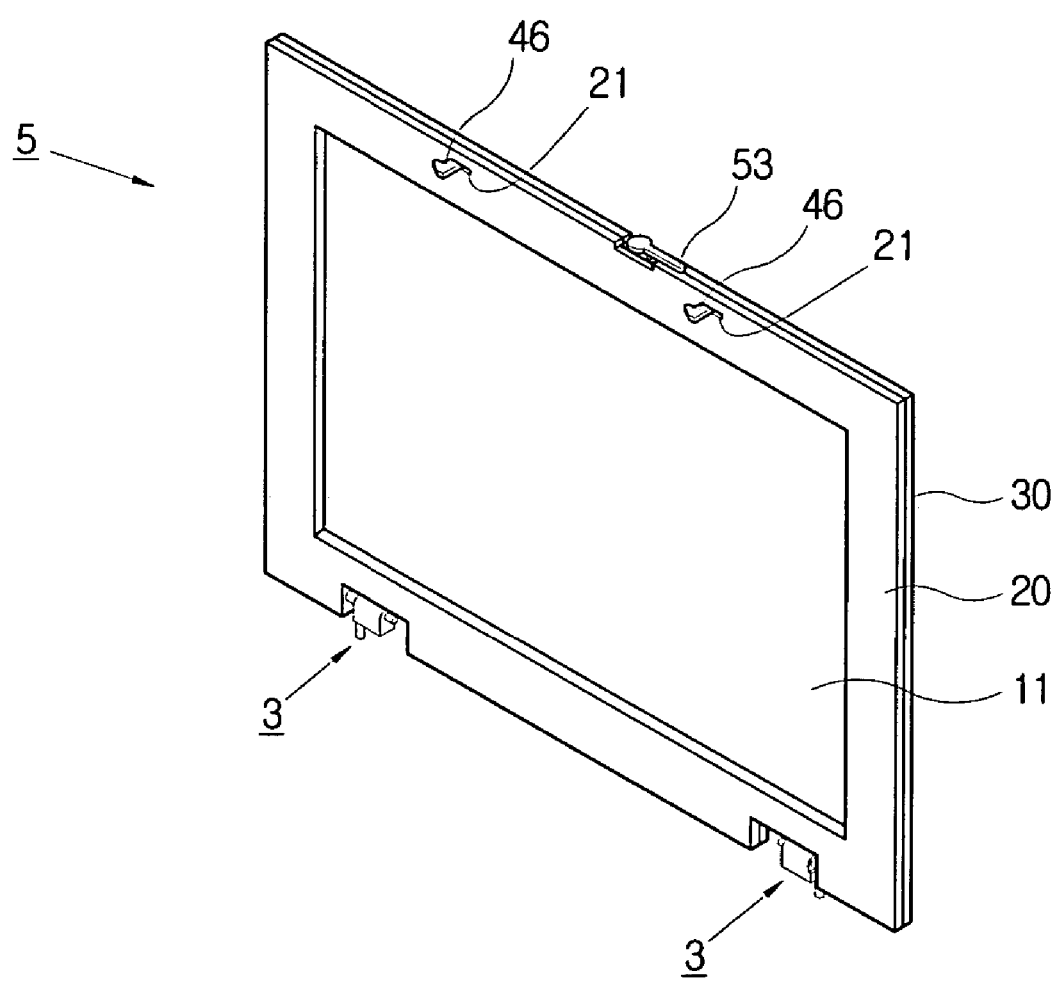
FIG. 2 is a perspective view of a display of a portable computer as shown in FIG. 1.
Figure 3:
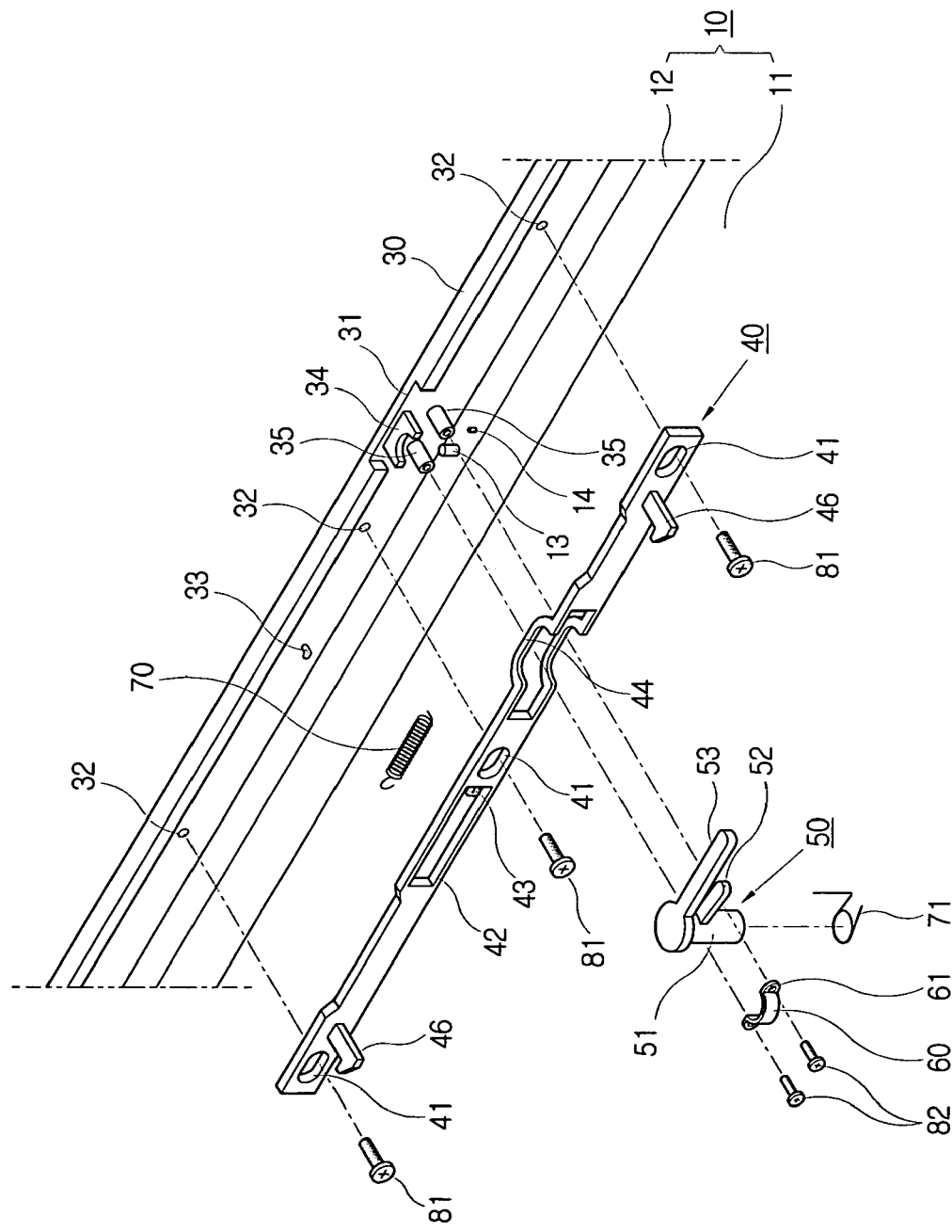
FIG. 3 is a partial exploded perspective view of the display of FIG. 2.

As shown in FIGS. 1–3, a portable computer according to the present invention comprises a computer main body 1, a display 5 connected to the computer main body 1, and a hinge 3 connecting the display 5 to the computer main body 1 for opening and closing the display 5 with respect to the computer main body 1.

The computer main body 1 comprises a plurality of hardware including a main board, a CPU, a ram, and so on. On an inside thereof, a keyboard 6 is provided functioning as an input unit for inputting input signals at an upper part thereof. Hook accommodators 2 are also provided and function as hooking parts for being hooked by hooks 46 of a latch part 40, as will be described later.

The display 5 comprises an LCD panel assembly, a front cover 20, and a back cover 30. The front cover 20 and back cover 30 are coupled to each other from the front and back sides of the LCD panel assembly 10.

The LCD panel assembly 10 comprises an LCD panel 11 for outputting image signals from the computer main body 1, and a supporting frame 12 supporting a circumference of the LCD panel 11.

The supporting frame 12 comprises at an upper part thereof a rotating projection 13 rotatably disposed in a projection accommodating hole (not shown) of a rotating supporter 51 to be described later. The supporting frame 12 also comprises a plate spring supporter 14 supporting a side of a plate spring 71 elastically biasing a rotating operator 50 to be described later.

The front cover 20 is formed with an opening (not shown) at a center thereof exposing the LCD panel 11 outward. The front cover 20 is formed with hook passages 21 disposed at an upper part of the opening for inserting thereinto the hooks 46 of the latch part 40. The front cover also is formed with a first through hole 22 disposed at an upper part of the hook passages 21 and exposing a rotating knob 53 outward.

The back cover 30 supports a back side of the LCD panel assembly 10 and is formed with a second through hole 31 positioned to correspond to the first through hole 22. A supporting rib 34 is disposed adjacent to the second through hole 31, projected from an inner side of the back cover 30 to the front cover 20. A pair of coupling bosses 35 are disposed at a lower part of the supporting rib 34.

The back cover 30 is formed with fastener coupling holes 32 to which first fasteners 81 supporting the latch part 40 are coupled. The fasteners, can, of course, be screws or any other suitable fasteners. A latch spring fixing part 33 is disposed between the pair of fastener coupling holes 32 fixing a side of a latch spring 70 and for elastically biasing the latch part 40.

The portable computer according to an embodiment of the present invention further comprises a locking means capable of locking and unlocking the display 5 with respect to the computer main body 1.

When the display 5 is locked through the locking means, the display 5 is closed with respect to the computer main body 1. As shown in FIG. 1, when the display 5 is unlocked through the locking means, the display 5 can be opened with respect to the computer main body 1.

The locking means comprises the hook accommodators 2 of the computer main body 1. The latch part 40 is coupled to the back cover 30, and movable between a hooking position hooked to the hook accommodators 2 and an unhooking position unhooked to the hook accommodators 2 along a length direction of the latch part 40. The rotating operator 50 is operable to operate movement of the latch part 40 between the hooking position and the unhooking position.

The latch part 40 comprises a pair of hooks 46 capable of hooking and unhooking on the hook accommodators 2. Guiding slots 41 are provided for inserting therethrough the first fasteners 81 coupled to the fastener coupling holes 32 of the back cover 30. The latch part also includes an installing part 44 in which the rotating operator 50 is installed and a latch spring installing part 42 in which the latch spring 70 is installed.

The guiding slots 41 extend through a surface of the latch part 40, and the first fasteners 81 are inserted into the guiding long holes 41 and coupled to the fastener coupling holes 32 of the back cover 30. The first fasteners 81 inserted into the guiding long holes 41 guide a sliding of the latch part 40 between the hooking position and the unhooking position.

The installing part 44 is bent from a center of the latch part 40 to the back cover 30 and extends through a back side thereof for inserting therethrough the supporting rib 34 to support the rotating operator 50. The installing part 44 is disposed on a side thereof formed with an incline 45 for contacting a latch pressing part 52 of the rotating operator 50 in the state that the latch part 40 moves from the hooking position to the unhooking position.

A surface of the latch part 40 is penetrated by the latch spring installing part 42 so that the latch spring 70 is able to bias the latch part 40 from the hooking position to the unhooking position. In the state that the latch spring 70 is accommodated in the latch spring installing part 42, a side of the latch spring 70 is fixed at the latch spring fixing part 33 of the back cover 30, and the other side of the latch spring 70 is fixed at a latch spring hanger 43 formed in the latch spring installing part 42.

The rotating operator 50 is rotatably installed on the installing part 44 of the latch part 40. When the rotating operator 50 rotates upward, the latch part 40 is moved from the hooking position to the unhooking position along the length direction of the latch part 40. When the rotating operator 50 rotates downward, the latch part 40 is moved from the unhooking position to the hooking position along the length direction of the latch part 40. The rotating operator 50 is coupled to the plate spring 71. The plate spring 71 functions as a spring part elastically returning the rotating operator 50, which rotated upward, to an opposite direction (e.g. an original position) so as to move the latch part 40 from the hooking position to the unhooking position.

The rotating operator 50 comprises a rectangular shaped rotating supporter 51 rotatably installed at the installing part 44 of the latch part 40. The latch pressing part 52 extends perpendicularly to a direction of the length of the rotating supporter 51, and is able to contact with the incline 45 formed in the installing part 44. The rotating knob 53 extends perpendicularly to the direction of the length of the rotating supporter 51, and is exposed to the outside thereof through the first through hole 22, and the second through hole 31.

The rotating supporter 51 is disposed at a lower part thereof and has a recess, so that the rotating supporter 51 is formed with a projection accommodating hole (not shown) rotatably accommodating the rotating projection 13 of the supporting frame 12 therein. When the user grips the rotating knob 53 and rotates the rotating supporter 51, the latch pressing part 52 transmits a rotating force of the rotating supporter 51 to the latch part 40 and forces the latch part 40 to slide along the length direction of the latch part 40. In other words, a rotational movement of the rotating supporter 51 occurring in the state that the user grips the rotating knob 53 and rotates the rotating supporter 51, is changed to straight movement of the latch part 40 according to the latch pressing part 52 contacting the incline 45 of the installing part 44.

A side of the plate spring 71 is fixed at the plate spring supporter 14 of the supporting frame 12, and the other side of the plate spring 71 is coupled to a lower part of the rotating supporter 51 for contacting an outside of the rotating supporter 51. The plate spring 71 biases the rotating operator 50 in an unhooking direction, which is in an opposite direction (e.g. an original position).

Figure 7A:
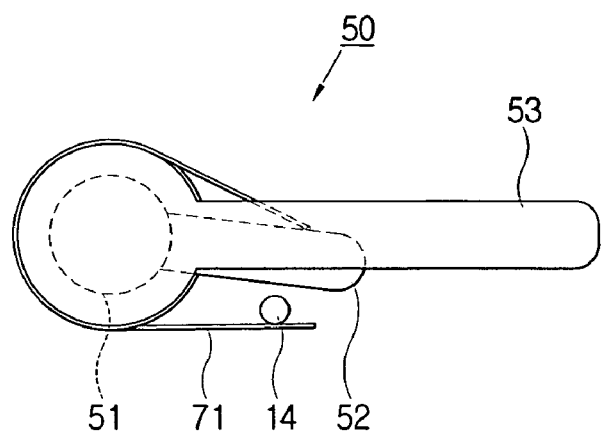
FIG. 7*a* is illustrating a state of a plate spring at a hooking position of a latch part.
Figure 7B:
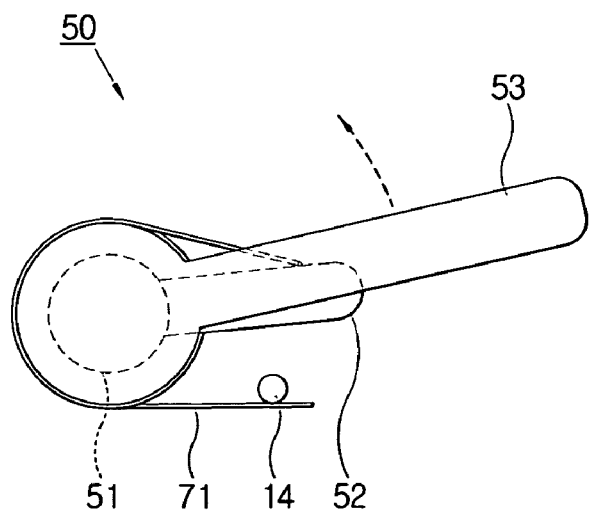
FIG. 7*b* is illustrating a state of a plate spring at an unhooking position of a latch part.

As shown in FIG. 7b, the plate spring 71 elastically extends in the state that the user moves the rotating knob 53 of the rotating operator 50 upward. As shown in FIG. 7a, the plate spring 71 returns to the original position due to an elastic force in the state that the user releases the rotating knob 53.

The rotating operator 50 is supported by the installing part 44 using supporting means. The supporting means comprises a supporting rib 34 that projects from an inside of the back cover 30 to the front cover 20 and supports the rotating supporter 51 at a back side thereof. Additionally, a supporting bracket 60 supports the rotating supporter 51 at a front side thereof.

The supporting bracket 60 is coupled to coupling bosses 35 projecting from an inside of the back cover 30, and the supporting rib 34 is disposed between opposite ends of the supporting bracket 60. Second fasteners 82 pass through fastener passing holes 61 formed at the opposite ends of the supporting bracket 60, and are coupled to the coupling bosses 35. Thus, the supporting bracket 60 is coupled to the coupling bosses on a front side of the rotating supporter 51.

Movements of the portable computer with this configuration according to the present invention, for unlocking and opening the display 5 are described by referring to FIG. 4, FIG. 5, and FIGS. 6a through 6c as follows.

As shown in FIGS. 4 through 6a, a locking state in which the display 5 is closed with respect to the computer main body 1 is described as an initial state.

Figure 4:
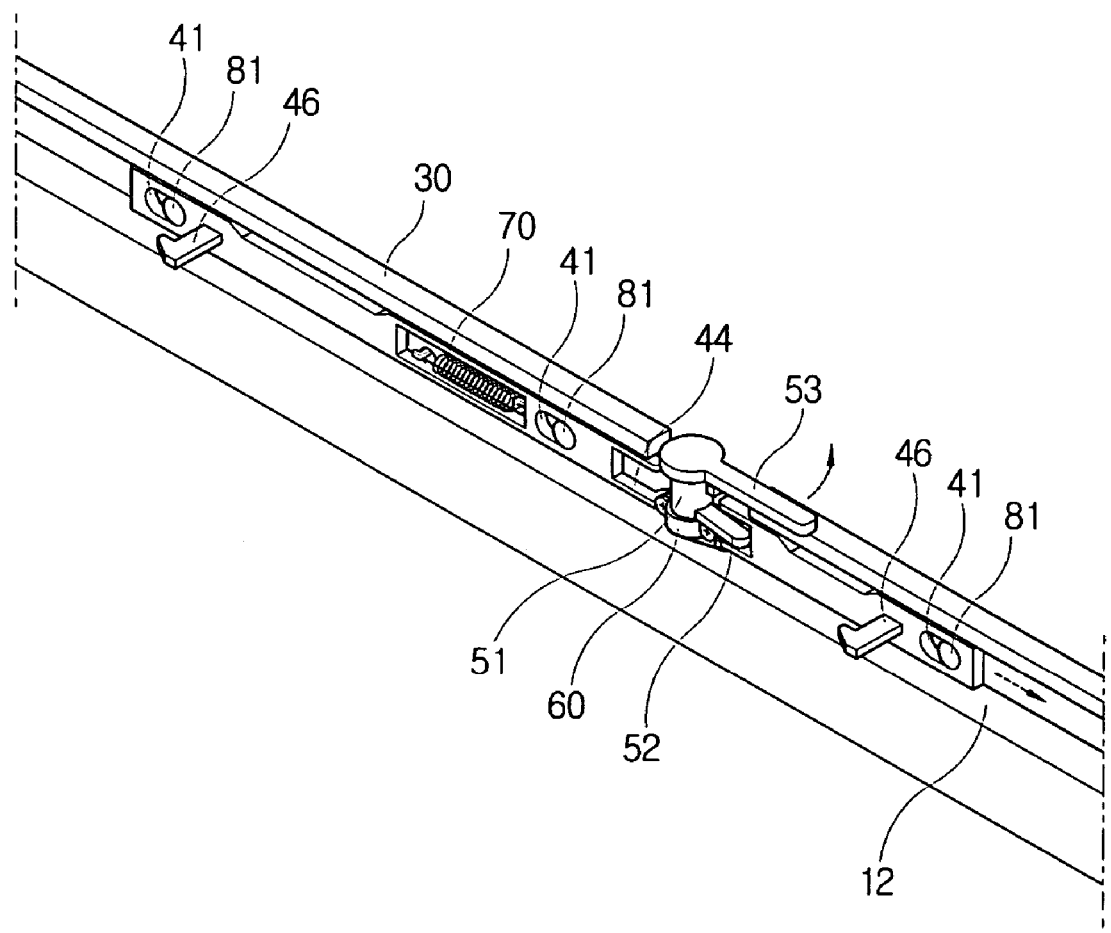
FIGS. 4 and 5 are operating views of a latch part and a rotating modulator of the display of FIG. 3.
Figure 6A:
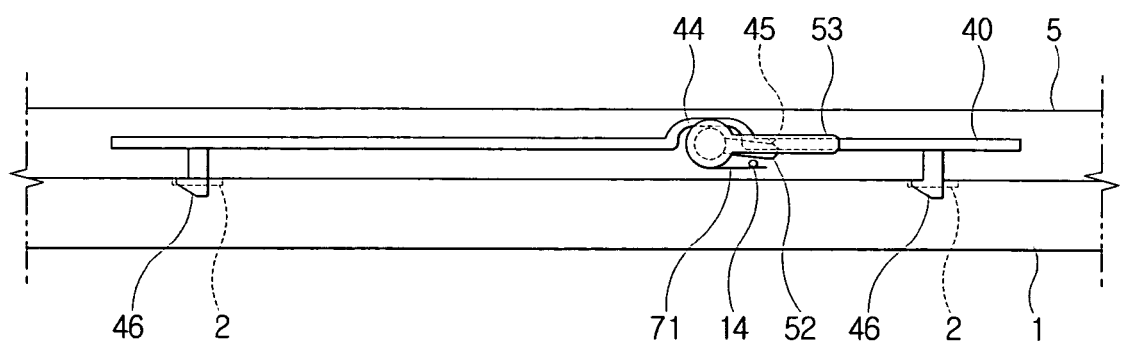
FIGS. 6*a* through 6*c* are views sequentially showing unlocking operations of the display with respect to the computer main body.

As shown in FIG. 4 and 6a, at the initial state the hooks 46 of the latch part 40 are respectively hooked to the hook accommodators 2 of the computer main body 1. The latch spring 70 is coupled to the latch part 40 and is not elastically varied.

Also, the rotating supporter 51 of the rotating operator 50 is rotatably installed in the installing part 44 of the latch part 40. Specifically, the rotating supporter 51 is on the back side thereof supported by the supporting rib 34 and is inserted through the opening of the installing part 44, on a front side thereof supported by the supporting bracket 60 which is coupled to the coupling bosses 35 formed in the back cover 30. The projection accommodating hole formed in a lower part of the rotating supporter 51 accommodates the rotating projection 13. Also, the plate spring 71 coupled to the rotating supporter 51 of the rotating operator 50 is not elastically varied as shown in FIG. 7a.

At the initial state described above, when the user want to open the display 5 as shown in FIG. 1, the user easily raises the rotating knob 53 of the rotating operator 50 upward. Then, the latch part 40 moves to the unhooking position and the hook accommodators 2 and the hooks 46 are separately unhooked. Accordingly, the display 5 is opened therefrom as shown in FIG. 1, by rotating upward centering with respect to the hinges 3 according to power raising the rotating knob 53, as shown in FIG. 6.

Figure 5:
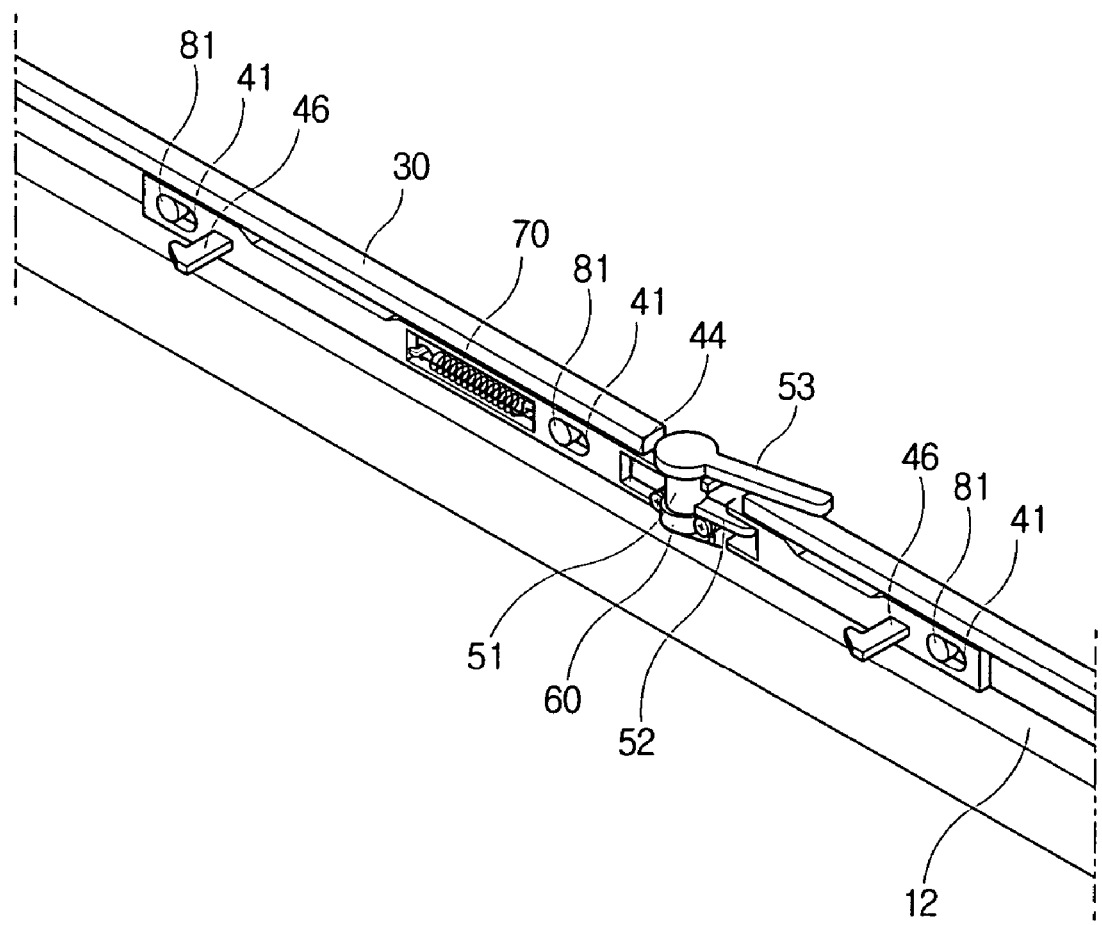
Figure 6B:
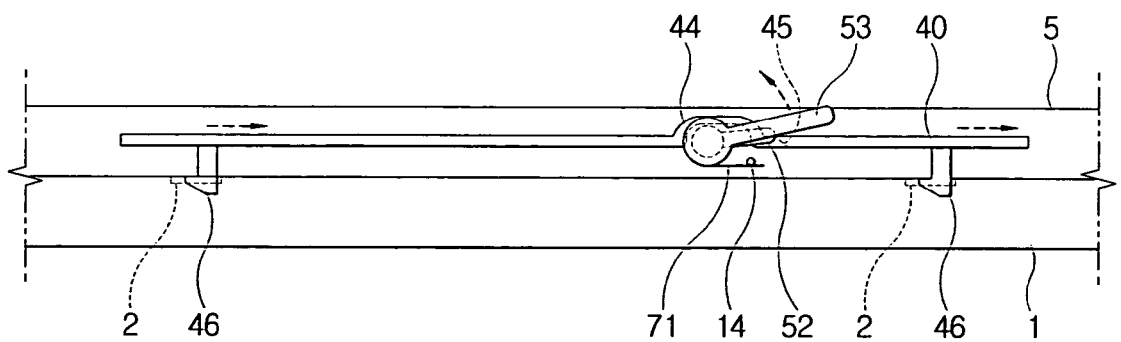
Figure 6C:
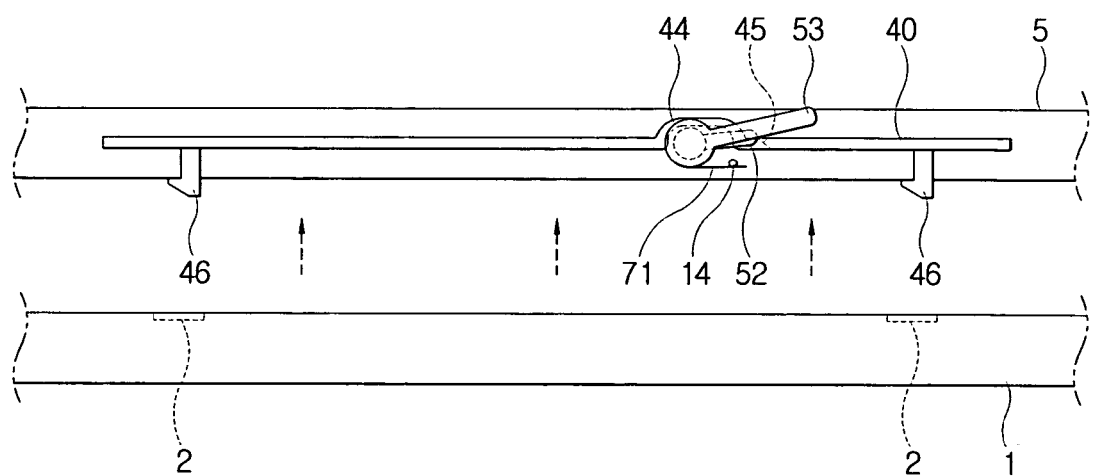

Consequently, the user raises upward the rotating knob 53 of the rotating operator 50, as shown in FIGS. 5 and 6a, and the rotating supporter 51 rotates centering with respect to the rotating projection 13, and the latch pressing part 52 pushes the incline 45 of the installing part 44, as shown in FIGS. 5 and 6b. The latch part 40 moves to a right direction (i.e. an unhooking position). Accordingly, the hooks 46 of the latch part 40 are separated from the hook accommodators 2. Herein, the latch spring 70 of the latch part 40 is elastically extended, as shown in FIG. 7b, and the plate spring 71 of the rotating operator 50 is elastically extended.

Meanwhile, when the user releases the rotating knob 53 of the rotating operator 50, as shown in FIG. 7a, the rotating operator 50 returns to the original position by rotating with respect to the rotating projection 13, facilitated by an elastic force of the plate spring 71.

In a conventional portable computer, the user can open the display with respect to the computer main body by grasping the unlocked display and moving the display upward. This is done after the display is unlocked with respect to the computer main body. However, in the portable computer according to the present invention, through only one motion raising the rotating operator 50 upward, the display 5 is unlocked with respect to the computer main body 1 and at the same time, the display 5 rotates upward centering with respect to the hinges 3 so that the display 5 may be easily opened therefrom.

Herein, the rotational movement of the rotating supporter 51 occurring in the state that the user grabs the rotating knob 53 of the rotating operator 50 and rotates the rotating supporter 51, is changed to the straight movement of the latch part 40 through the latch pressing part 52 contacting the incline 45 of the installing part 44. Accordingly, the hooks 46 of the latch part 40 and the hook accommodators 2 of the computer main body 1 are separately unhooked.

In other words, when the rotating supporter 51 rotates through the rotating knob 53, the latch pressing part 52 rotates with the rotating supporter 51 and contacts the incline 45, thus pushing the latch part 40 to the unhooking position.

Then the latch part 40 moves to the unhooking position along the length direction of the latch part 40. Accordingly, the hooks 46 of the latch part 40 and the hook accommodators 2 of the computer main body 1 are separately unhooked.

The rotating knob 53 was employed for rotating the rotating supporter 51 and the latch pressing part 52 so as to unhook the latch part 40. However, when the latch part 40 is unhooked thereto, the rotating knob 53 is employed as a handle for rotating the display 5 upward and is centered with respect to the hinges 3 to open the display as shown in FIG. 1. Accordingly, through only one motion raising the rotating operator 50 upward, the display 5 is unlocked with respect to the computer main body 1 and at the same time, the display 5 rotates upwardly and is centered with respect to the hinges 3 so that the display 5 can be easily opened therefrom.

While the invention has been shown and described with reference to certain embodiments thereof, it will be understood by those skilled in the art that various changes in form and details may be made without departing from the spirit and scope of the invention as defined by the appended claims.

What is claimed is:
1. A portable computer comprising:
 a computer main body;
 a display connected to the computer main body;
 a hooking part provided in one of the computer main body and the display;

a latch part provided in the other of the computer main body and the display, and movable between a hooking position hooked to the hooking part and an unhooking position unhooked to the hooking part; and a rotating operator rotatably coupled to the latch part, and selectively moving the latch part to the hooking position and the unhooking position according to a rotating direction thereof.

2. The portable computer according to 1, wherein the hooking part comprises a hook accommodator in the computer main body, and the latch part is provided in the display and comprises a hook adapted to hook to the hook accommodator.

3. The portable computer according to 1, wherein the rotating operator comprises a rotating supporter adapted to rotate with respect to the latch part;

a rotating knob disposed at a side of the rotating supporter and rotating the rotating supporter; and a latch pressing part disposed adjacent to the rotating knob for transmitting a rotating force of the rotating supporter from the rotating knob to the latch part.

4. The portable computer according to 1, wherein the display rotates with respect to the computer main body according to the rotating operator in the state that the rotating operator rotates for moving the latch part to the unhooking position.

5. The portable computer according to 3, wherein the latch part comprises an installing part in which the rotating operator is installed;

the rotating supporter is rotatably installed inside of the installing part; and an incline is formed on a side of the installing part for contacting the installing part with the latch pressing part.

6. The portable computer according to 5, further comprising a supporting rib supporting the rotating operator in the installing part projects from an inner surface of the display and supports the rotating operator at a back side thereof, and a supporting bracket supports the rotating operator at a front side thereof.

7. The portable computer according to 6, further comprising a spring part being coupled to the rotating operator, and the spring part biases the rotating operator an opposite direction with the respect to the rotating direction of the rotating operator in which the latch part moves to the unhooking position.

8. A portable computer comprising:

a computer main body;

a display connected to the computer main body;

a hooking part provided in the computer main body;

a latch part provided in the display, and movable between a hooking position hooked to the hooking part and an unhooking position unhooked to the hooking part; and a rotating operator rotatably coupled to the latch part, and selectively moving the latch part to the hooking position and the unhooking position according to a rotating direction thereof, wherein the rotating operator comprises a rotating supporter adapted to rotate with respect to the latch part;

a rotating knob disposed on a side of the rotating supporter and rotating the rotating supporter; and a latch pressing part disposed adjacent to the rotating knob for transmitting a rotating force of the rotating supporter from the rotating knob to the latch part.

9. The portable computer according to 8, wherein the latch part comprises an installing part in which the rotating operator is installed;

the rotating supporter is rotatably installed inside of the installing part; and an incline is formed on a side of the installing part for contacting the installing part with the latch pressing part.

10. The portable computer according to 9, further comprising a supporting rib for supporting the rotating operator in the installing part projects from an inner surface of the display and supports the rotating operator at a back side thereof, and a supporting bracket supports the rotating operator at a front side thereof.

11. The portable computer according to 10, further comprising a spring part being coupled to the rotating operator, and the spring part biases the rotating operator to an opposite direction with the respect to the rotating direction of the rotating operator in which the latch part moves to the unhooking position.

12. A portable computer comprising:

a computer main body;

a display connected to the computer main body;

a hooking part provided in one of the computer main body and the display;

a latch part provided in the other of the computer main body and the display, and movable between a hooking position hooked to the hooking part and an unhooking position unhooked to the hooking part; and a rotating operator rotatably coupled to the latch part, and selectively moving the latch part to the hooking position and the unhooking position according to a rotating direction thereof, wherein the rotating operator comprises a rotating supporter adapted to rotate with respect to the latch part;

a rotating knob disposed at a side of the rotating supporter and rotating the rotating supporter; and a latch pressing part disposed adjacent to the rotating knob, and transmitting a rotating force of the rotating supporter by the rotating knob to the latch part, and wherein the display rotates with respect to the computer main body according to the rotating operator in the state that the rotating operator rotates for moving the latch part to the unhooking position.

* * * * *